(12) United States Patent
Lee et al.

(10) Patent No.: US 7,909,467 B2
(45) Date of Patent: Mar. 22, 2011

(54) PROJECTION APPARATUS, LIGHT SOURCE MODULE AND BEAM COMBINER ADAPTED TO PROJECTION APPARATUS

(75) Inventors: Chia-Chang Lee, Hsinchu (TW); Wan-Chiang Wang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 408 days.

(21) Appl. No.: 12/055,986

(22) Filed: Mar. 26, 2008

(65) Prior Publication Data
US 2009/0091712 A1    Apr. 9, 2009

(30) Foreign Application Priority Data
Oct. 3, 2007    (TW) .............................. 96216519 U

(51) Int. Cl.
*G02B 27/14*    (2006.01)
(52) U.S. Cl. ........................................... 353/31; 353/53
(58) Field of Classification Search .................... 353/31, 353/53
See application file for complete search history.

(56) References Cited

U.S. PATENT DOCUMENTS

| | | | |
|---|---|---|---|
| 6,154,259 A | 11/2000 | Hargis et al. | |
| 6,229,581 B1 | 5/2001 | Yamamoto et al. | |
| 6,238,051 B1 | 5/2001 | Huang | |
| 6,665,123 B2 | 12/2003 | Nakajo et al. | |
| 6,690,521 B2 | 2/2004 | Hashizume et al. | |
| 2005/0201107 A1* | 9/2005 | Seki .............................. | 362/373 |
| 2006/0044523 A1* | 3/2006 | Teijido et al. ................... | 353/53 |

FOREIGN PATENT DOCUMENTS
TW    567341    12/2003
TW    571119    1/2004

* cited by examiner

*Primary Examiner* — Seung C Sohn
(74) *Attorney, Agent, or Firm* — J.C. Patents

(57) ABSTRACT

A beam combiner for combining a first color beam, a second color beam, and a third color beam is provided. The beam combiner has a transparent substrate with a first optical surface on which a first reflective film reflecting the first color beam is disposed, and a second optical surface on which a second reflective film reflecting the second color beam is disposed. The first optical surface and the second optical surface are parallel. The second color beam entering the transparent substrate is reflected by the second reflective film and leaves the transparent substrate by passing through the first optical surface, while the third color beam enters the transparent substrate from the second optical surface and leaves the transparent substrate by passing through the first optical surface. The optical paths of the first, the second, and the third color beam are substantially coincident after emerging from the first optical surface.

15 Claims, 4 Drawing Sheets

PROJECTION APPARATUS, LIGHT SOURCE MODULE AND BEAM COMBINER ADAPTED TO PROJECTION APPARATUS

CROSS-REFERENCE TO RELATED APPLICATION

This application claims the priority benefit of Taiwan application serial no. 96216519, filed on Oct. 3, 2007. The entirety of the above-mentioned patent application is hereby incorporated by reference herein and made a part of this specification.

BACKGROUND OF THE INVENTION

1. Field of the Invention

The present invention relates to a display apparatus, and more particularly to a projection apparatus, a light source module, and a beam combiner.

2. Description of Related Art

FIG. 1 is a schematic view of a conventional beam combiner. Referring to FIG. 1, a conventional beam combiner 100 includes a red reflecting mirror 110a and a blue reflecting mirror 110b. A blue beam L10c emitted by a blue light source 50c is reflected by the blue reflecting mirror 110b. A red beam L10a emitted by a red light source 50a is reflected by the red reflecting mirror 110a, and mixes with the blue beam L10c. A green beam L10b emitted by a green light source 50b passes through the red reflecting mirror 110a and the blue reflecting mirror 110b, and mixes with the red beam L10a and the blue beam L10c.

FIG. 2 is a schematic view of another conventional beam combiner. Referring to FIG. 2, a conventional beam combiner 200 includes a red prism 210a, a green prism 210b, and a blue prism 210c. The red prism 210a has a red reflecting surface 212a, and the blue prism 210c has a plurality of blue reflecting surfaces 212c. The blue beam L10c emitted by the blue light source 50c is reflected by the blue reflecting surfaces 212c. The red beam L10a emitted by the red light source 50a is reflected by the red reflecting surface 212a, and mixes with the blue beam L10c. The green beam L10b emitted by the green light source 50b passes through the red reflecting surface 212a and the blue reflecting surfaces 212c, and mixes with the red beam L10a and the blue beam L10c.

The beam combiner 100 is required to have a plurality of reflecting mirrors, so the volume of the beam combiner 100 cannot be reduced. The beam combiner 200 has a plurality of prisms, and the processes of the prism are complex, and thus the manufacturing cost of the beam combiner cannot be reduced.

SUMMARY OF THE INVENTION

The present invention is directed to provide a beam combiner, having the advantages of small volume and low manufacturing cost.

The present invention is further directed to provide a light source module, having small number of elements and low manufacturing cost.

The present invention is further directed to provide a projection apparatus, having a relatively small number of elements and low manufacturing cost.

As embodied and broadly described herein, a beam combiner capable of combining a first color beam, a second color beam, and a third color beam is provided. The beam combiner has a transparent substrate, a first reflective film, and a second reflective film. The transparent substrate has a first optical surface and a second optical surface parallel to the first optical surface. The first reflective film reflecting the first color beam is disposed on the first optical surface, and the second reflective film reflecting the second color beam is disposed on the second optical surface. The second color beam entering the transparent substrate is reflected by the second reflective film and leaves the transparent substrate by passing through the first optical surface. The third color beam enters the transparent substrate from the second optical surface and leaves the transparent substrate by passing through the first optical surface. The optical paths of the first color beam reflected by the first optical surface, the second color beam after emerging from the transparent substrate, and the third color beam after emerging from the transparent substrate are substantially coincident.

As embodied and broadly described herein, a light source module adapted to emit an illuminating beam is provided. The light source module includes a light-emitting member and the above beam combiner. The light-emitting member is adapted to emit a first color beam, a second color beam, and a third color beam. The beam combiner is disposed on the optical paths of the first color beam, the second color beam, and the third color beam. The optical paths of the first color beam reflected by first optical surface, the second color beam after emerging from the transparent substrate, and the third color beam after emerging from the transparent substrate are substantially coincident, so as to form an illuminating beam.

In an embodiment of the present invention, a projection apparatus including the above light source module and a scanning element is provided. The scanning element is disposed on the optical path of the illuminating beam, and is adapted to convert the illuminating beam into a scanning beam.

As described above, a plurality of reflective films is disposed on the transparent substrate of a beam combiner, so only one element is required to achieve the beam combining effect, thus reducing the number of elements and the volumes of the source module and the projection apparatus.

In order to make the aforementioned and other objectives, features, and advantages of the present invention comprehensible, embodiments accompanied with figures are described in detail below.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
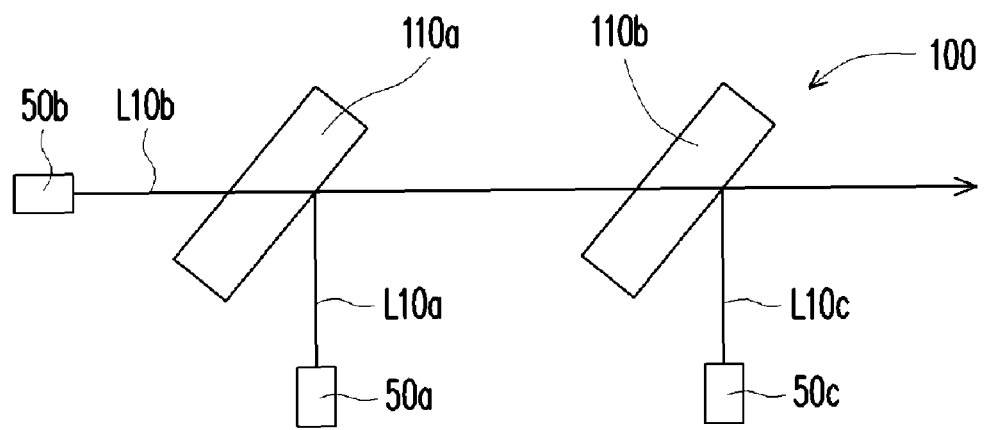
FIG. 1 is a schematic view of a conventional beam combiner.
Figure 2:
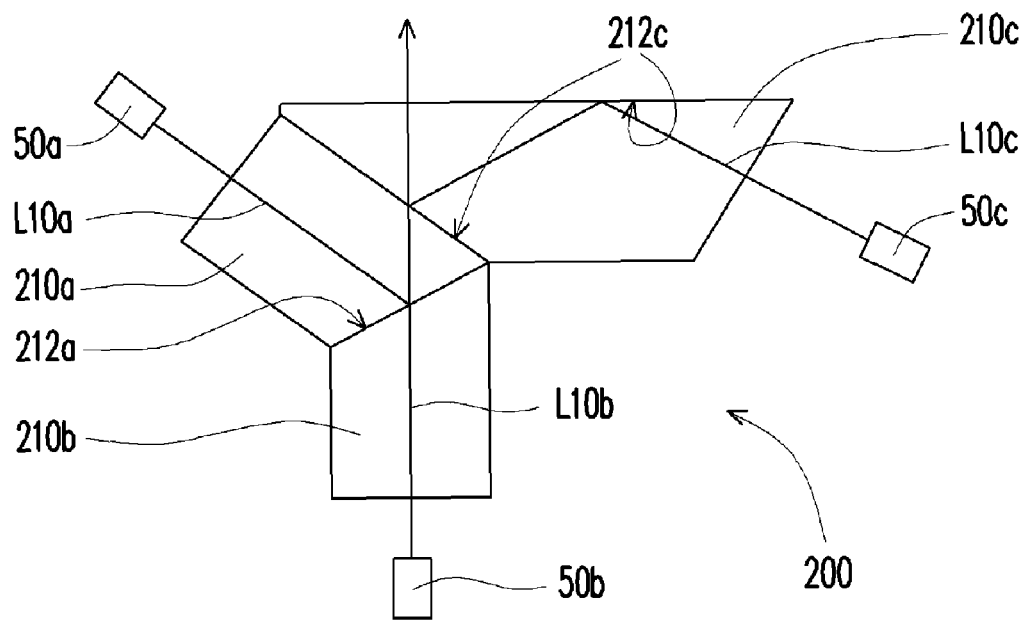
FIG. 2 is a schematic view of another conventional beam combiner.
Figure 3:
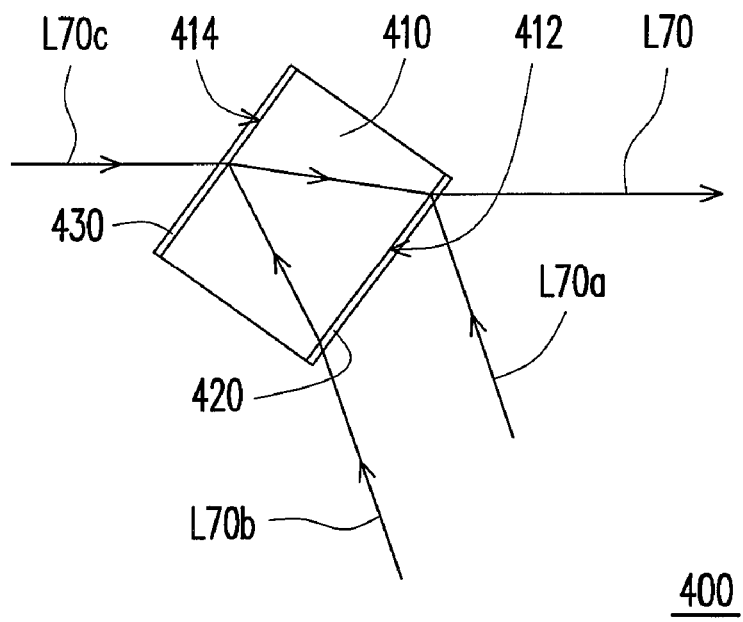
FIG. 3 is a schematic view of a beam combiner according to an embodiment of the present invention.

FIG. 3 is a schematic view of a beam combiner according to an embodiment of the present invention. Referring to FIG. 3, a beam combiner 400 is capable of combining a first color beam L70a, a second color beam L70b, and a third color beam L70c. The beam combiner 400 includes a transparent substrate 410, a first reflective film 420, and a second reflective film 430. The transparent substrate 410 has a first optical surface 412 and a second optical surface 414 parallel to the first optical surface 412. The first reflective film 420 is disposed on the first optical surface 412, and is capable of reflecting the first color beam L70a. The second reflective film 430 is disposed on the second optical surface 414, and is capable of reflecting the second color beam L70b. In this embodiment, the first reflective film 420 is, for example, a red reflective film. The second reflective film 430 is, for example, a blue reflective film. The first color beam L70a, the second color beam L70b, and the third color beam L70c are respectively red, blue, and green. It should be noted that, the first reflective film 420 and the second reflective film 430 may also be arranged in another manner. For example, the first reflective film is a green reflective film, and the second reflective film is a red reflective film, and the appropriate first color beam, second color beam, and third color beam are used together. Those skilled in the art can modify the arrangements on the basis of the content disclosed in the present invention.

The first color beam L70a is emitted towards the first optical surface 412 of the transparent substrate 410, and is reflected by the first reflective film 420. In this embodiment, the second color beam L70b enters the transparent substrate 410 from the first optical surface 412. The second color beam L70b entering the transparent substrate 410 is reflected by the second reflective film 430, and leaves the transparent substrate 410 by passing through the first optical surface 412. The third color beam L70c enters the transparent substrate 410 from the second optical surface 414, and leaves the transparent substrate 410 by passing through the first optical surface 412. The optical paths of the first color beam L70a after reflected by the first optical surface 412, the second color beam L70b after emerging from the transparent substrate 410, and the third color beam L70c after emerging from the transparent substrate 410 are substantially coincident, so as to form an illuminating beam L70.

Since the first reflective film 420 and the second reflective film 430 are respectively disposed on the first optical surface 412 and the second optical surface 414 of the transparent substrate 410 in this embodiment, only one element is required to achieve the effect of combining the first color beam L70a, the second color beam L70b, and the third color beam L70c to form the illuminating beam L70. In this way, the number of elements of the projection apparatus using the beam combiner is reduced, and further the volume of the projection apparatus is reduced. In addition, the transparent substrate 410 only requires a first optical surface 412 and a second optical surface 414 parallel to the first optical surface 412, and does not require the prism structure. As such, steps such as polishing may be saved, and the processes of the beam combiner 400 may be simplified, thus reducing the cost and facilitating mass production. For example, those skilled in the art can obtain the beam combiner 400 just by coating the first reflective film 420 and the second reflective film 430 on two sides of a glass plate respectively, and then cutting the glass plate.

Figure 4:
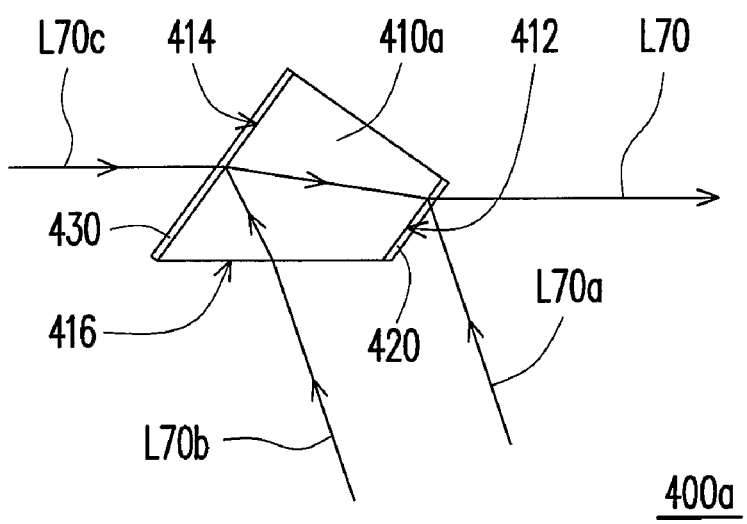
FIG. 4 is a schematic view of a beam combiner according to another embodiment of the present invention.

In the above embodiments, the second color beam L70b enters the transparent substrate 410 from the first optical surface 412. However, those skilled in the art would be appreciate that the present invention is not limited to the above-mentioned embodiments and can also be implemented in other methods. FIG. 4 is a schematic view of a beam combiner according to another embodiment of the present invention. Referring to FIG. 4, it should be noted that the embodiment shown in FIG. 4 is similar to the embodiment of FIG. 3, and the same or similar reference numerals appearing in this embodiment of FIG. 4 and the embodiment of FIG. 3 are used to indicate the same or similar elements. Hereinafter, only the difference between the two embodiments will be illustrated in detail, and those identical parts will not be described herein.

The beam combiner 400a of this embodiment further has a third optical surface 416. The second color beam L70b enters the transparent substrate 410a from the third optical surface 416, and is reflected by the second reflective film 430, and then leaves the transparent substrate 410a by passing through the first optical surface 412.

Figure 5:
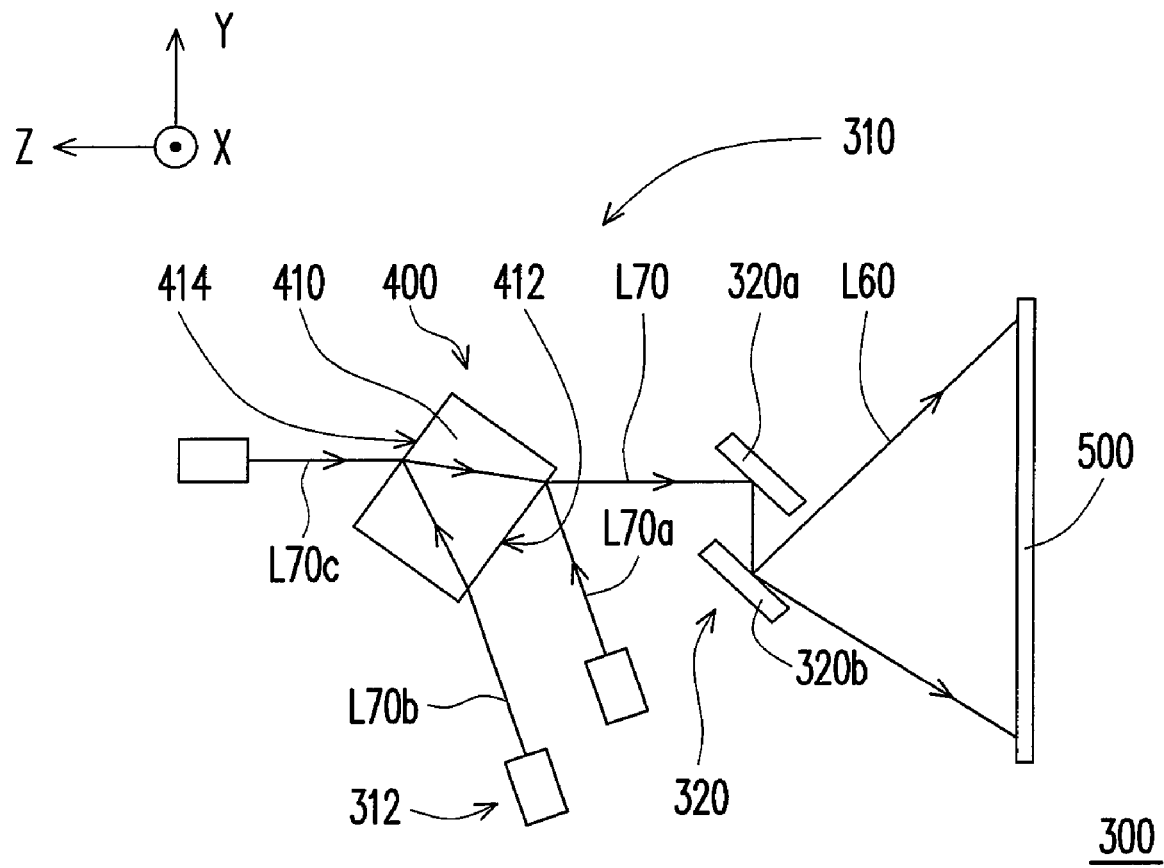
FIG. 5 is a schematic view of the projection apparatus using the beam combiner of FIG. 3.

FIG. 5 is a schematic view of a projection apparatus using the beam combiner of FIG. 3. It should be noted that this embodiment is similar to the embodiment of FIG. 3, and the same or similar reference numerals appearing in this embodiment and the embodiment of FIG. 3 are used to indicate the same or similar elements. Referring to FIG. 5, in this embodiment, the projection apparatus 300 is, for example, a scanning projection apparatus. The projection apparatus 300 includes a light source module 310 and a scanning element 320. The light source module 310 may emit an illuminating beam L70, and the scanning element 320 is disposed on the optical path of the illuminating beam L70, so as to convert the illuminating beam L70 into a scanning beam L60 to be sequentially projected on a screen 500 to form an image (not shown).

In this embodiment, the light source module 310 includes a light-emitting member 312 and a beam combiner 400. The light-emitting member 312 may emit a first color beam L70a, a second color beam L70b, and a third color beam L70c. The beam combiner 400 is disposed on the optical paths of the first color beam L70a, the second color beam L70b, and the third color beam L70c. The first color beam L70a, the second color beam L70b, and the third color beam L70c are substantially mixed after passing through the beam combiner 400, so as to form the illuminating beam L70.

Accordingly, the scanning element 320 may include a first scanning reflecting mirror 320a and a second scanning reflecting mirror 320b. The first scanning reflecting mirror 320a may rotate about a third direction Z, so as to enable the illuminating beam L70 to scan along a first direction X perpendicular to the third direction Z. The second scanning reflecting mirror 320b may rotate about the first direction X, so as to enable the illuminating beam L70 to scan along a second direction Y perpendicular to the first direction X and the third direction Z. The scanning element 320 converts the illuminating beam L70 into the scanning beam L60 to be sequentially projected on the screen 500 along the first direction X and the second direction Y. Moreover, the scanning element 320 may also be implemented in another manner, for example, using one or two reflecting mirrors rotating axially (e.g., the first direction X and the second direction Y), but the present invention is not limited to this.

As the projection apparatus 300 uses the beam combiner 400 to combine the first color beam L70a, a second color beam L70b, and a third color beam L70c emitted by the light-emitting member 312 into the illuminating beam L70, thus reducing the number of elements and further reducing the volume of the projection apparatus 300.

Moreover, since the projection apparatus 300 uses the scanning element 320 to convert the illuminating beam L70 into the scanning beam L60 to be directly projected on the screen 500 sequentially to produce the image. In this manner, the elements such as light valve and projection lens of the conventional projection system are not required, and thus the volume of the projection apparatus 300 is further reduced.

Figure 6:
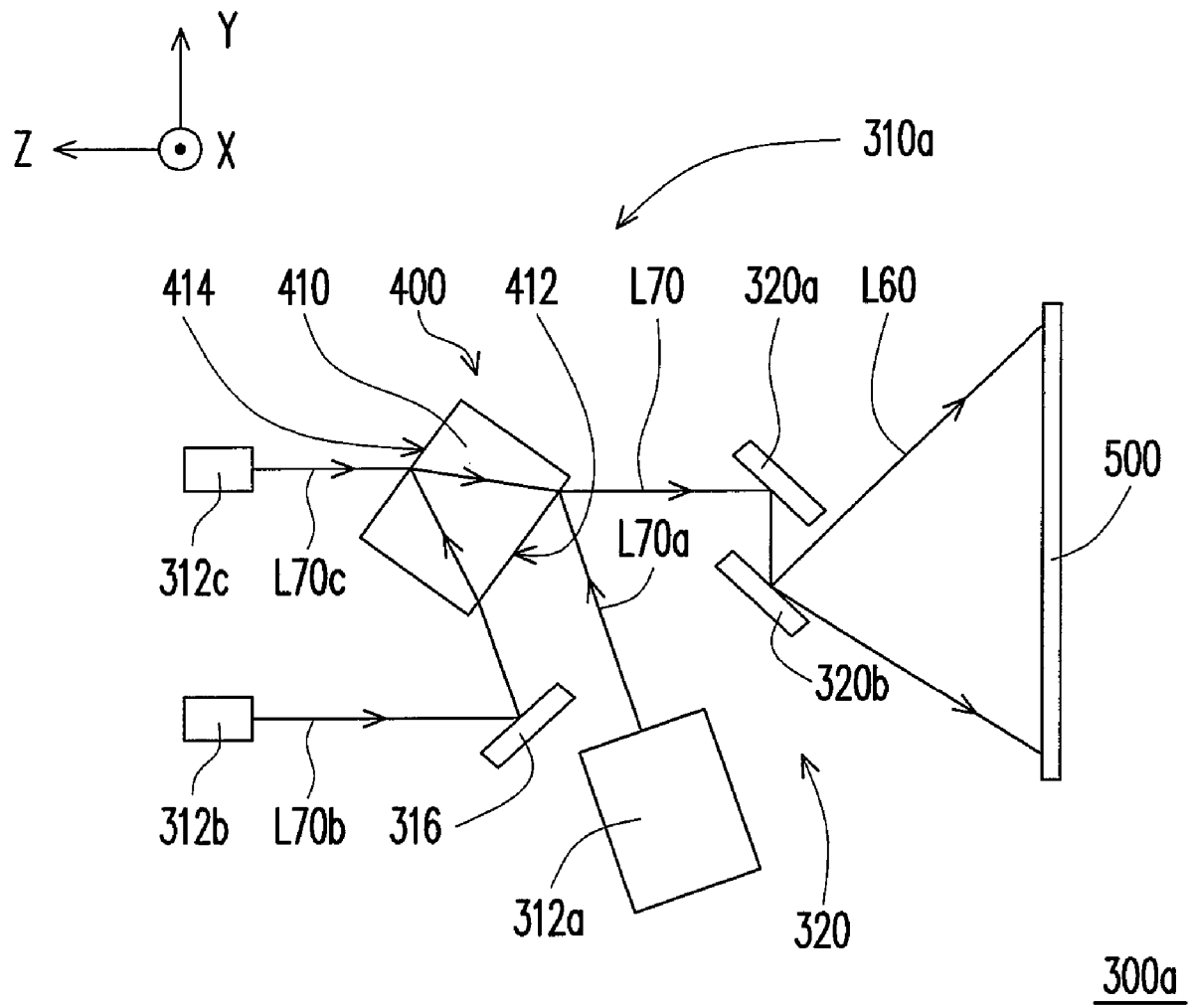
FIG. 6 is a schematic view of a projection apparatus according to another embodiment of the present invention.

FIG. 6 is a schematic view of a projection scanning system according to another embodiment of the present invention. Referring to FIG. 6, it should be noted that this embodiment is similar to the embodiment of FIG. 5, and the same or similar reference numerals appearing in this embodiment and the embodiment of FIG. 5 are used to indicate the same or similar elements. Hereinafter, only the difference between the two embodiments will be illustrated in detail, and those identical parts will not be described herein.

In this embodiment, the light source module 310a of the projection apparatus 300a further includes a reflecting mirror 316 disposed on the optical path of the second color beam L70b, and located between the light-emitting member 312 and the first optical surface 412 of the beam combiner 400. The second color beam L70b after reflected by the reflecting mirror 316 enters the first optical surface 412 in a direction parallel to the first color beam L70a. In this embodiment, laser sources are used as the light-emitting member 312. The light-emitting member 312 includes a green laser source 312a, a blue laser source 312b, and a red laser source 312c. The first color beam L70a, the second color beam L70b, and the third color beam L70c are a green laser beam, a blue laser beam, and a red laser beam respectively. Since the volume of the green laser source 312a is larger, the blue laser source 312b and the red laser source 312c may be disposed on the same side, and the green laser source 312a is disposed on the other side. Since the green laser beam does not interfere with the red laser beam and the blue laser beam, the reflecting mirror 316 may be used to enable the blue laser beam and the green laser beam to be parallel to avoiding interference.

It should be noted that in the above embodiment, the projection apparatus applying the beam combiner 400 is used for illustration. However, those skilled in the art may also apply the variations of the beam combiner according to an embodiment of the present invention to the projection apparatus, for example, apply the beam combiner 400a to the projection apparatus, which will not be limited herein.

In view of the above, the beam combiner according to an embodiment of the present invention has a plurality of reflective film disposed on the transparent substrate, so only one beam combiner may achieve the beam combining function, thus effectively reducing the number of elements used in the projection apparatus, and further reducing the volume of the projection apparatus. Moreover, the transparent substrate of the beam combiner only requires two parallel surfaces without using the prism, so the fabricating processes are simplified and the manufacturing cost is reduced, which facilitates the mass production.

Moreover, the projection apparatus according to an embodiment of the present invention uses a scanning element to convert the illuminating beam into the scanning beam. The scanning beam directly scans the screen to produce an image, thus reducing the number of elements used in the projection apparatus and further reducing the volume of the projection apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A beam combiner adapted to a projection apparatus and capable of combining a first color beam, a second color beam, and a third color beam, the beam combiner comprising:
   a transparent substrate, having a first optical surface and a second optical surface parallel to the first optical surface;
   a first reflective film, disposed on the first optical surface and capable of reflecting the first color beam; and
   a second reflective film, disposed on the second optical surface and capable of reflecting the second color beam, wherein the second color beam entering the transparent substrate is reflected by the second reflective film, and leaves the transparent substrate by passing through the first optical surface, and the third color beam enters the transparent substrate from the second optical surface, and leaves the transparent substrate by passing through the first optical surface, and optical paths of the first color beam after reflected by the first optical surface, the second color beam after emerging from the transparent substrate, and the third color beam after emerging from the transparent substrate are substantially coincident.

2. The beam combiner as claimed in claim 1, wherein the second color beam enters the transparent substrate from the first optical surface.

3. The beam combiner as claimed in claim 1, further comprising a third optical surface, wherein the second color beam enters the transparent substrate from the third optical surface.

4. The beam combiner as claimed in claim 1, wherein the first reflective film is one selected from a red reflective film, a green reflective film, and a blue reflective film, and the second reflective film is another one selected from the red reflective film, the green reflective film, and the blue reflective film.

5. A light source module, adapted to a projection apparatus and capable of emitting an illuminating beam, the light source module comprising:
   a light-emitting member, capable of emitting a first color beam, a second color beam, and a third color beam; and
   a beam combiner, disposed on optical paths of the first color beam, the second color beam, and the third color beam, the beam combiner comprising:
      a transparent substrate, having a first optical surface and a second optical surface parallel to the first optical surface;
      a first reflective film, disposed on the first optical surface and capable of reflecting the first color beam; and
      a second reflective film, disposed on the second optical surface and capable of reflecting the second color beam, wherein the second color beam entering the transparent substrate is reflected by the second reflective film, and leaves the transparent substrate by passing through the first optical surface, and the third color beam enters the transparent substrate from the second optical surface, and leaves the transparent substrate by passing through the first optical surface, and the optical paths of the first color beam after reflected by the first optical surface, the second color beam after emerging from the transparent substrate, and the third color beam after emerging from the transparent substrate are substantially coincident, so as to form the illuminating beam.

6. The light source module as claimed in claim 5, wherein the second color beam enters the transparent substrate from the first optical surface.

7. The light source module as claimed in claim 5, wherein the transparent substrate further comprises a third optical surface, and the second color beam enters the transparent substrate from the third optical surface.

8. The light source module as claimed in claim 5, wherein the first reflective film is one selected from a red reflective film, a green reflective film, and a blue reflective film, and the second reflective film is another one selected from the red reflective film, the green reflective film, and the blue reflective film.

9. The light source module as claimed in claim 5, further comprising a reflecting mirror disposed on the optical path of the second color beam and located between the light-emitting member and the first optical surface, wherein the second color beam after reflected by the reflecting mirror enters the first optical surface in a direction parallel to the first color beam.

10. A projection apparatus, comprising:
    a light source module, capable of emitting an illuminating beam, comprising:
       a light-emitting member, capable of emitting a first color beam, a second color beam, and a third color beam;
       a beam combiner, disposed on optical paths of the first color beam, the second color beam, and the third color beam, the beam combiner comprising:
          a transparent substrate, having a first optical surface and a second optical surface parallel to the first optical surface;
          a first reflective film, disposed on the first optical surface and capable of reflecting the first color beam; and
          a second reflective film, disposed on the second optical surface, and capable of reflecting the second color beam, wherein the second color beam entering the transparent substrate is reflected by the second reflective film, and leaves the transparent substrate by passing through the first optical surface, and the third color beam enters the transparent substrate from the second optical surface, and leaves the transparent substrate by passing through the first optical surface, and the optical paths of the first color beam after reflected by the first optical surface, the second color beam after emerging from the transparent substrate, and the third color beam after emerging from the transparent substrate are substantially coincident, so as to form the illuminating beam;
    a scanning element, disposed on an optical path of the illuminating beam and capable of converting the illuminating beam into a scanning beam.

11. The projection apparatus as claimed in claim 10, wherein the second color beam enters the transparent substrate from the first optical surface.

12. The projection apparatus as claimed in claim 10, wherein the transparent substrate further has a third optical surface and the second color beam enters the transparent substrate from the third optical surface.

13. The projection apparatus as claimed in claim 10, wherein the first reflective film is one selected from a red reflective film, a green reflective film, and a blue reflective film, and the second reflective film is another one selected from the red reflective film, the green reflective film, and the blue reflective film.

14. The projection apparatus as claimed in claim 10, wherein the light source module further comprises a reflecting mirror disposed on the optical path of the second color beam and located between the light-emitting member and the first optical surface, and the second color beam after reflected by the reflecting mirror enters the first optical surface in a direction parallel of the first color beam.

15. The projection apparatus as claimed in claim 10, wherein the scanning element comprises:
   a first scanning reflecting mirror; and
   a second scanning reflecting mirror, wherein the first scanning reflecting mirror is capable of enabling the illuminating beam scan along a first direction, and the second reflecting mirror is capable of enabling the illuminating beam scan along a second direction perpendicular to the first direction.

* * * * *